United States Patent
Eisele et al.

(10) Patent No.: US 9,647,265 B2
(45) Date of Patent: May 9, 2017

(54) ALL-SOLID STATE CELL

(71) Applicant: ROBERT BOSCH GMBH, Stuttgart (DE)

(72) Inventors: Ulrich Eisele, Stuttgart (DE); Alan Logeat, Stuttgart (DE); Hideki Ogihara, Haimhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/381,864

(22) PCT Filed: Jan. 24, 2013

(86) PCT No.: PCT/EP2013/051286
§ 371 (c)(1),
(2) Date: Aug. 28, 2014

(87) PCT Pub. No.: WO2013/127573
PCT Pub. Date: Sep. 6, 2013

(65) Prior Publication Data
US 2015/0044576 A1    Feb. 12, 2015

(30) Foreign Application Priority Data

Feb. 29, 2012 (DE) .......... 10 2012 203 139

(51) Int. Cl.
*H01M 4/36* (2006.01)
*H01M 4/131* (2010.01)
(Continued)

(52) U.S. Cl.
CPC .......... *H01M 4/366* (2013.01); *C01G 23/005* (2013.01); *C01G 33/006* (2013.01);
(Continued)

(58) Field of Classification Search
None
See application file for complete search history.

(56) References Cited

U.S. PATENT DOCUMENTS

| 7,582,386 B2 * | 9/2009 | Takami .............. H01M 2/1077 429/218.1 |
| 2006/0093921 A1 * | 5/2006 | Scott ..................... A61N 1/378 429/245 |

(Continued)

FOREIGN PATENT DOCUMENTS

| EP | 2420475 A1 * | 2/2012 | ............... C01G 1/00 |
| WO | 03/030283 | 4/2003 |

(Continued)

OTHER PUBLICATIONS

Kitaura et al.; "High-rate performance of all-solid-state lithium secondary batteries using Li4Ti5O12 electrode"; Journal of Power Sources 189 (2009), pp. 145-148. Available online Oct. 11, 2008.*
Kaoru Dokko et., "In Situ Observation of LiNiO2 Single-Particle Fracture During Li-Ion Extraction and Insertion," Electrochemical and Solid-State Letters, 3 (3), pp. 125-127, 2000.
Atsushi Sakuda et al., "Electrochemical Performance of All-Solid-State Lithium Secondary Batteries Improved by the Coating of Li2O—TiO2 Films on LiCoO2 Electrode," Journal of Power Sources 195, pp. 599-603, 2010.

*Primary Examiner* — Gregg Cantelmo
(74) *Attorney, Agent, or Firm* — Gerard Messina

(57) ABSTRACT

An all-solid-state cell, which includes a lithium-containing anode, a cathode and a lithium ion-conducting solid-state electrolyte separator situated between the anode and the cathode. To improve the safety and cycle stability of the cell, the cathode includes a composite material including at least one lithium titanate and at least one lithium ion-conducting solid-state electrolyte. Furthermore, the invention relates to a corresponding all-solid-state battery and a mobile or stationary system equipped with it.

20 Claims, 1 Drawing Sheet

(51) Int. Cl.
*H01M 4/134* (2010.01)
*H01M 4/38* (2006.01)
*H01M 4/485* (2010.01)
*H01M 4/52* (2010.01)
*H01M 10/052* (2010.01)
*H01M 10/0525* (2010.01)
*H01M 10/0562* (2010.01)
*C01G 23/00* (2006.01)
*C01G 33/00* (2006.01)
*C01G 35/00* (2006.01)
*C01G 49/00* (2006.01)
*H01M 4/02* (2006.01)

(52) U.S. Cl.
CPC ......... *C01G 35/006* (2013.01); *C01G 49/009* (2013.01); *H01M 4/131* (2013.01); *H01M 4/134* (2013.01); *H01M 4/364* (2013.01); *H01M 4/382* (2013.01); *H01M 4/485* (2013.01); *H01M 4/523* (2013.01); *H01M 10/052* (2013.01); *H01M 10/0525* (2013.01); *H01M 10/0562* (2013.01); *C01P 2002/50* (2013.01); *C01P 2006/40* (2013.01); *H01M 2004/027* (2013.01); *H01M 2004/028* (2013.01); *H01M 2300/0071* (2013.01); *H01M 2300/0077* (2013.01); *H01M 2300/0091* (2013.01); *Y02T 10/7011* (2013.01)

(56) References Cited

U.S. PATENT DOCUMENTS

| 2007/0087269 | A1* | 4/2007 | Inda | C01B 25/45 429/322 |
| 2007/0226990 | A1* | 10/2007 | Morimoto | H01M 4/667 29/623.1 |
| 2009/0155692 | A1* | 6/2009 | Park | C01G 23/003 429/231.1 |
| 2010/0273062 | A1* | 10/2010 | Tsuchida | H01M 4/131 429/304 |
| 2011/0081580 | A1* | 4/2011 | Stadler | H01M 4/131 429/319 |
| 2011/0195315 | A1 | 8/2011 | Tsuchida et al. | |
| 2012/0164536 | A1* | 6/2012 | Huang | H01M 4/485 429/231.1 |

FOREIGN PATENT DOCUMENTS

| WO | WO 2004100292 A1 * | 11/2004 | |
| WO | 2009/029746 | 3/2009 | |
| WO | WO 2009074208 A2 * | 6/2009 | |
| WO | 2010/129875 | 11/2010 | |
| WO | WO 2012106102 A1 * | 8/2012 | ............ H01M 4/366 |

* cited by examiner

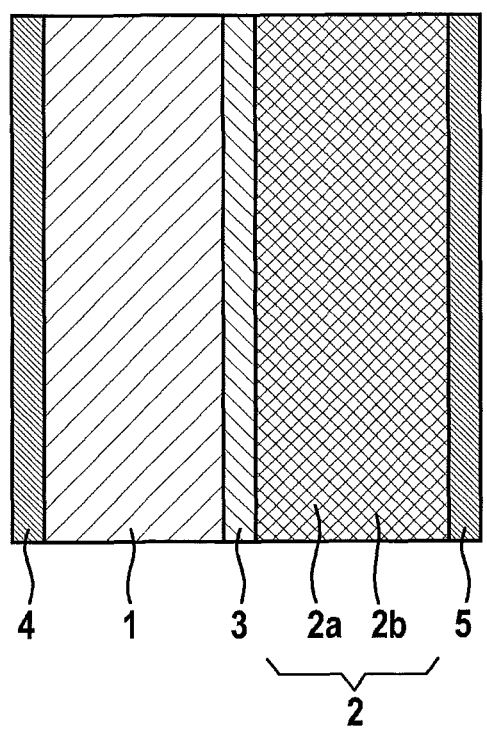

ALL-SOLID STATE CELL

FIELD OF THE INVENTION

The present invention relates to an all-solid-state cell, an all-solid-state battery and a mobile or stationary system.

BACKGROUND INFORMATION

Batteries are presently of particular interest both for mobile and stationary applications. So-called all-solid-state batteries contain exclusively solid materials, and in particular solid-state electrolytes, and in contrast to conventional batteries containing liquid electrolytes, they have several advantages.

The replacement of liquid electrolytes by solid-state electrolytes makes it possible, for example, to reduce the risk of a thermal runaway as well as an explosion of the battery and to increase the safety and the cycle stability of the battery.

However, a replacement of liquid electrolytes by solid-state electrolytes is normally accompanied by a reduction of the capacity of the cathode, since materials such as $LiCoO_2$ have low lithium ion conductivity and only thin solid-state electrolyte films may be used in all-solid-state batteries.

To overcome this problem, Sakuda et al. in the Journal of Power Sources 2010 proposed a battery which includes a silicon anode, a $Li_2S \cdot P_2S_5$-solid-state electrolyte separator and a cathode made from a mixture of $Li_2S \cdot P_2S_5$ and $LiNbO_3$—$LiCoO_2$.

$LiCoO_2$ is used in this case as an intercalation material into which lithium ions may be inserted during the charge process, and at the same time it functions as an electron conductor.

$Li_2S \cdot P_2S_5$ and $LiNbO_3$ are used in this case as additives conducting lithium ions to compensate for the low lithium ion conductivity of $LiCoO_2$.

However, $LiCoO_2$ exhibits a volume expansion of 9% during the discharge process and a volume contraction of 9% during the charge process (see Dokko et al., Electrochem. Solid-State Lett. 3, 125, 2000).

This change in volume may, however, have the result that the contact between the $LiCoO_2$ particles and $Li_2S \cdot P_2S_5$ or $LiNbO_3$ is interrupted, causing the capacity of the battery to drop after several charge and discharge cycles.

SUMMARY OF THE INVENTION

An object of the present invention is an all-solid-state cell which includes a lithium-containing anode, a cathode and a lithium ion-conducting solid-state electrolyte separator situated between the anode and the cathode.

To achieve high safety and cycle stability of the cell, the cathode includes a composite material including at least one lithium titanate and at least one lithium ion-conducting solid-state electrolyte. If necessary, the cathode may be formed from such a composite material.

In this case, the at least one lithium titanate is used as an intercalation material, into which lithium atoms may be reversibly inserted and removed, which is also referred to as intercalation or deintercalation of lithium ions.

The at least one lithium ion-conducting solid-state electrolyte is used in this case for achieving a high transport of lithium ions through the composite material and consequently through the cathode.

Lithium titanates, which may also be referred to as lithium titanium oxides, advantageously exhibit only a slight change in volume between the charge and discharge processes, which in turn has an advantageous impact on the contact between the lithium titanate used as intercalation material and the lithium ion-conducting solid-state electrolytes supporting the transport of lithium ions. In the case of repeated charge and discharge processes, this in turn makes it possible to avoid contact losses and associated capacity losses, and in this way improve the cycle stability of the cell.

The omission of liquid electrolytes may also increase the cell's safety.

The composite material may include a doped lithium titanate.

In the context of a specific embodiment, the composite material includes a copper-doped and/or iron-doped lithium titanate. Copper-doped and/or iron-doped lithium titanates have proven to be particularly advantageous, since they exhibit a particularly low change in volume between the charge and discharge processes, in particular less than 0.5%, as well as good electrical conductivity, in particular $\geq 10^{-1}$ S/cm at 25° C. An iron doping also makes it possible to advantageously achieve a higher cell voltage. In particular, the at least one lithium titanate contained in the composite material may be a copper-doped and/or iron-doped lithium titanate.

In the context of another alternative or additional specific embodiment, the composite material includes a lithium-inserted lithium titanate. An insertion of additional lithium into a lithium titanate may in particular be described by the formula $Li_{4+x}Ti_5O_{12}$. In this case, $0<x\leq 3$ is possible. The insertion of additional lithium into a lithium titanate may advantageously increase the lithium-ion conductivity of the lithium titanate to, for example, $>10^{-5}$ S/cm. Moreover, a lithium insertion may also significantly increase the electrical conductivity of the lithium titanate to, for example, $\sim 5 \cdot 10^{-2}$ S/cm. An insertion of additional lithium into a lithium titanate may be carried out, for example, chemically and/or electrochemically. A chemical lithium insertion may be carried out, for example, by submerging a calcined and, if necessary, sintered lithium titanate into a lithium-containing liquid. An electrochemical lithium insertion may be carried out, for example, by installing, for example, a calcined and, if necessary, sintered lithium titanate as a cathode in a galvanic load cell, the load cell including a lithium-containing anode and a lithium-containing electrolyte, and the cathode including no other electrochemically active cathode materials in addition to the lithium titanate. In particular, the at least one lithium titanate contained in the composite material may be a lithium-inserted lithium titanate.

In the context of another alternative or additional specific embodiment, the composite material includes a lithium titanate calcined in a reducing atmosphere. The reducing atmosphere may in this case include in particular hydrogen and, for example, a noble gas-hydrogen atmosphere, in particular, an argon-hydrogen atmosphere. In relation to the total volume of the gases of the reducing atmosphere, the hydrogen content may in this case be greater than or equal to 5 vol.-% to less than or equal to 20 vol.-%. Calcination in a reducing atmosphere advantageously makes it possible to achieve an electrical conductivity of $\sim 10^{-2}$ S/cm. In particular, the at least one lithium titanate contained in the composite material may be a lithium titanate calcined in a reducing atmosphere.

Alternatively or in addition to this, the composite material may include a niobium-doped and/or tantalum-doped lithium titanate. In particular, the at least one lithium titanate contained in the composite material may be a niobium-doped and/or tantalum-doped lithium titanate.

In the context of a special specific embodiment, the composite material includes at least one lithium titanate which is based on the general chemical formula or corresponds to it:

$$Li_{4+x-y-z}Fe_{3y}Cu_zTi_{5-2y-m}(Nb,Ta)_mO_{12},$$

where $0 \leq x \leq 3$, $0 \leq y \leq 1$, in particular $0 \leq y \leq 1$, for example, 0.2 or 0.25 or $0.345 \leq y \leq 0.75$ or 1, $z \geq 0$, in particular $0 \leq z \leq 0.2$, and $0 \leq m \leq 0.1$.

The term "based" may be understood to mean that the lithium titanate may include additional elements, in particular as doping, in addition to the elements denoted in the formula.

The term "correspond" may be understood to mean that the lithium titanate includes no additional elements apart from those denoted in the formula.

Based on the advantages explained above, which may be $z > 0$ and/or $y > 0$ and/or $x > 0$ and/or the lithium titanate is calcined in a reducing atmosphere.

Lithium titanates, in particular copper-doped and/or iron-doped and/or lithium-inserted lithium titanates, may have a spinel-like and/or NaCl-like structure, in particular a spinel-like structure. A spinel-like and/or NaCl-like structure may be understood to be, for example, a structure which is similar to or includes the crystal structure of spinel and/or the crystal structure of NaCl. Studies indicate that the structure of lithium titanate, in particular as a function of the quantity of inserted lithium, may have a spinel-like moiety and an NaCl-like moiety.

In the context of another specific embodiment, the composite material includes particles containing or formed from lithium titanate, which are partially or completely coated with the at least one lithium ion-conducting solid-state electrolyte, in particular of the composite material. This embodiment of the composite material has proven to be particularly advantageous for improving the cycle stability and for ensuring a rapid transport of lithium ions through the composite material and consequently the cathode. The at least one lithium ion-conducting solid-state electrolyte, in particular of the composite material, may be applied to the particles containing lithium titanate using known thin film deposition methods. Here, it is possible to apply two or more layers, in particular of different lithium ion-conducting solid-state electrolytes, to the particles containing lithium titanate. For example, the composite material may include particles containing or formed from lithium titanate, which are partially or completely coated with a lithium ion-conducting solid-state electrolyte layer, which in turn is coated with one or multiple additional, in particular different types, of lithium ion-conducting solid-state electrolyte layers.

In the context of another specific embodiment, the at least one lithium ion-conducting solid-state electrolyte, in particular of the composite material or with which the particles containing lithium titanate are coated, is selected from the group made up of lithium sulfide-phosphorus sulfides ($Li_2S.P_2S_5$), lithium lanthanum zirconates, in particular those having a garnet structure, ($Li_7La_3Zr_2O_{12}$), lithium niobates ($LiNbO_3$) and mixtures of them and/or layer systems thereof. These lithium ion-conducting solid-state electrolytes have proven to be advantageous for improving the transport of lithium ions through the composite material and consequently the cathode. In particular, lithium sulfide-phosphorus sulfides and/or lithium lanthanum zirconates may be used in this case. These lithium ion-conducting solid-state electrolytes have proven to be particularly advantageous for improving the transport of lithium ions through the composite material and consequently the cathode. In this case, it is, for example, possible to use a layer system made up of two or more, in particular different layers, each of the layers being formed, for example, from one of the above-mentioned compounds or a mixture of the above-mentioned compounds.

In the context of another specific embodiment, the solid-state electrolyte separator includes at least one lithium sulfide-phosphorus sulfide ($Li_2S.P_2S_5$) and/or at least one lithium lanthanum zirconate, in particular having a garnet structure, ($Li_7La_3Zr_2O_{12}$) or is formed from it. These materials have proven to be particularly advantageous for forming the separator.

In the context of another specific embodiment, the anode is formed from metallic lithium. Thus, a particularly high voltage may be achieved. Since the all-solid-state cell contains no liquid electrolytes, undesirable reactions of the metallic lithium may thus be avoided and a high level of safety is ensured.

With regard to additional technical features and advantages of the all-solid-state cell according to the present invention, reference is explicitly made to the explanations in connection with the all-solid-state battery according to the present invention, the mobile or stationary system according to the present invention as well as the drawing.

Another object of the present invention is an all-solid-state battery which includes at least one, in particular at least two, all-solid-state cell(s) according to the present invention.

With regard to additional technical features and advantages of the all-solid-state battery according to the present invention, reference is explicitly made to the explanations in connection with the all-solid-state cell according to the present invention, the mobile or stationary system according to the present invention as well as the drawing.

Another object of the present invention is a mobile or stationary system which includes an all-solid-state cell according to the present invention and/or an all-solid-state battery according to the present invention. In particular, it may be a vehicle, for example, a hybrid, a plug-in hybrid, or an electric vehicle, an energy storage system, for example, for stationary energy storage, for example, in a house or a technical installation, a power tool, an electrical garden tool or an electronic device, for example, a sensor, a smart card, a notebook computer, a PDA or a mobile telephone.

With regard to additional technical features and advantages of the mobile or stationary system according to the present invention, reference is explicitly made to the explanations in connection with the all-solid-state cell according to the present invention, the all-solid-state battery according to the present invention as well as the drawing.

Other advantages and advantageous embodiments of the objects according to the present invention are illustrated by the drawing and explained in the following description. It should be noted that the drawing has only a descriptive nature and is not intended to limit the present invention in any form.

BRIEF DESCRIPTION OF THE DRAWING

The FIGURE shows a schematic cross section through a specific embodiment of an all-solid-state cell according to the present invention.

DETAILED DESCRIPTION

The FIGURE shows that the all-solid-state cell includes an anode 1, a cathode 2 and a separator 3 situated between anode 1 and cathode 2. In the shown specific embodiment, anode 1 is a lithium metal anode. Separator 3 is formed from a lithium ion-conducting solid-state electrolyte, formed, for example, from lithium sulfide-phosphorus sulfide ($Li_2S.P_2S_5$) and/or lithium lanthanum zirconate ($Li_7La_3Zr_2O_{12}$).

Cathode 2 includes a composite material which includes at least one lithium titanate 2a and at least one lithium ion-conducting solid-state electrolyte 2b. In particular copper-doped and/or iron-doped lithium titanates of the general chemical formula: $Li_{4+x-y-z}Fe_{3y}Cu_zTi_{5-2y-m}(Nb,Ta)_mO_{12}$ where $0 \leq x \leq 3$, $0 \leq y \leq 1$, $z \geq 0$ and $0 \leq m \leq 0.1$ have proven to be advantageous as lithium titanates 2a. For example, lithium-sulfide-phosphorus sulfides ($Li_2S.P_2S_5$), lithium lanthanum zirconates having a garnet structure ($Li_7La_3Zr_2O_{12}$) or lithium niobates ($LiNbO_3$) as well as mixtures of them and layer systems thereof may be used as lithium ion-conducting solid-state electrolyte 2b.

The lattice structure in the FIGURE indicates in a highly schematic way that the composite material may include in particular lithium titanate particles 2a, which are partially or completely coated with the at least one lithium ion-conducting solid-state electrolyte. Thus, a good lithium ion conductivity may be advantageously ensured within the composite material and consequently within the cathode.

The FIGURE further shows that both anode 1 and cathode 2 have a current collector 4, 5.

What is claimed is:

1. An all-solid-state cell, comprising:
   a lithium-containing anode;
   a cathode; and
   a lithium ion-conducting solid-state electrolyte separator situated between the anode and the cathode;
   wherein:
   the cathode includes a composite material, the composite material including lithium titanate and a lithium ion-conducting solid-state electrolyte; and
   at least one of the following:
   the lithium ion-conducting solid-state electrolyte includes a plurality of layers that differ from each other by being composed of different ones of at least two of (a) lithium sulfide-phosphorus sulfides, (b) lithium lanthanum zirconates, and (c) lithium niobates; and
   the lithium titanate is based on the general chemical formula: $Li_{4+x-y-z}Fe_{3y}Cu_zTi_{5-2y-m}(Nb,Ta)_mO_{12}$, where each of x, z, and m is greater than 0.

2. The all-solid-state cell of claim 1, wherein the lithium titanate includes $Li_{4+B}$ and $B > 0$.

3. The all-solid-state cell of claim 2, wherein:
   $B = (x-y-z)$;
   the at least one lithium titanate is based on the general chemical formula: $Li_{4+x-y-z}Fe_{3y}Cu_zTi_{5-2y-m}(Nb,Ta)_mO_{12}$;
   $x \leq 3$;
   $y \leq 1$; and
   $m \leq 0.1$.

4. The all-solid-state cell of claim 1, wherein the composite material includes lithium titanate-containing particles, which are partially or completely coated with the lithium ion-conducting solid-state electrolyte.

5. The all-solid-state cell of claim 1, wherein the solid-state electrolyte separator includes at least one lithium sulfide-phosphorus sulfide and at least one lithium lanthanum zirconate.

6. The all-solid-state cell of claim 1, wherein the anode is formed from metallic lithium.

7. The all-solid-state cell of claim 1, wherein the lithium ion-conducting solid-state electrolyte of the cathode includes lithium lanthanum zirconates.

8. The all-solid-state cell of claim 1, wherein the lithium ion-conducting solid-state electrolyte of the cathode includes lithium niobates.

9. The all-solid state cell of claim 1, wherein the lithium ion-conducting solid-state electrolyte includes the plurality of layers that differ from each other by being composed of different ones of at least two of (a) lithium sulfide-phosphorus sulfides, (b) lithium lanthanum zirconates, and (c) lithium niobates.

10. The all-solid state cell of claim 1, wherein the lithium titanate is based on the general chemical formula: $Li_{4+x-y-z}Fe_{3y}Cu_zTi_{5-2y-m}(Nb,Ta)_mO_{12}$, where each of x, z, and m is greater than 0.

11. The all-solid state cell of claim 10, wherein the lithium titanate includes $Li_{4+B}$, and B, which equals x−y−z, is greater than 0.

12. The all solid state cell of claim 10, wherein y is greater than 0.

13. The all solid state cell of claim 12, wherein the lithium titanate includes $Li_{4+B}$, and B, which equals x−y−z, is greater than 0.

14. The all-solid-state cell of claim 13, wherein:
    $x \leq 3$;
    $y \leq 1$; and
    $m \leq 0.1$.

15. The all-solid-state cell of claim 10, wherein:
    $x \leq 3$;
    $y \leq 1$;
    $m \leq 0.1$.

16. The all-solid-state cell of claim 15, wherein $0.2 \leq y \leq 1$.

17. The all-solid-state cell of claim 15, wherein $z \leq 0.2$.

18. An all-solid-state battery, comprising:
    at least one all-solid-state cell that includes:
    a lithium-containing anode;
    a cathode; and
    a lithium ion-conducting solid-state electrolyte separator situated between the anode and the cathode;
    wherein:
    the cathode includes a composite material, the composite material including lithium titanate and a lithium ion-conducting solid-state electrolyte; and
    at least one of the following:
    the at least one lithium ion-conducting solid-state electrolyte includes a plurality of layers that differ from each other by being composed of different ones of at least two of (a) lithium sulfide-phosphorus sulfides, (b) lithium lanthanum zirconates, and (c) lithium niobates; and
    the lithium titanate is based on the general chemical formula: $Li_{4+x-y-z}Fe_{3y}Cu_zTi_{5-2y-m}(Nb,Ta)_mO_{12}$, where each of x, z, and m is greater than 0.

19. A system, comprising:
    at least one of a mobile system, a stationary system, a vehicle, an energy storage system, a power tool, an electrical garden tool, and an electronic device; and
    at least one all-solid-state cell that includes:
    a lithium-containing anode;
    a cathode; and
    a lithium ion-conducting solid-state electrolyte separator situated between the anode and the cathode;
    wherein:
    the cathode includes a composite material, the composite material including lithium titanate and a lithium ion-conducting solid-state electrolyte; and at least one of the following:
the at least one lithium ion-conducting solid-state electrolyte includes a plurality of layers that differ from each other by being composed of different ones of at least two of (a) lithium sulfide-phosphorus sulfides, (b) lithium lanthanum zirconates, and (c) lithium niobates; and
the lithium titanate is based on the general chemical formula: $Li_{4+x-y-z}Fe_{3y}Cu_zTi_{5-2y-m}(Nb,Ta)_mO_{12}$, where each of x, z, and m is greater than 0.

20. A method of producing an all-solid-state cell, comprising:
providing in combination a lithium-containing anode, a cathode, and a lithium ion-conducting solid-state electrolyte separator situated between the anode and the cathode;

wherein:
the cathode includes a composite material, the composite material including a lithium ion-conducting solid-state electrolyte and a lithium titanate;
the providing further comprises calcining the lithium titanate of the composite material in a reducing atmosphere; and
at least one of the following:
the lithium ion-conducting solid-state electrolyte includes a plurality of layers that differ from each other by being composed of different ones of at least two of (a) lithium sulfide-phosphorus sulfides, (b) lithium lanthanum zirconates, and (c) lithium niobates; and
the lithium titanate is based on the general chemical formula: $Li_{4+x-y-z}Fe_{3y}Cu_zTi_{5-2y-m}(Nb,Ta)_mO_{12}$, where each of x, z, and m is greater than 0.

* * * * *